United States Patent
Zou et al.

(10) Patent No.: US 9,325,194 B2
(45) Date of Patent: Apr. 26, 2016

(54) METHOD OF FORMING A POWER SUPPLY CONTROLLER AND STRUCTURE THEREFOR

(71) Applicants: Han Zou, Gilbert, AZ (US); Thomas Duffy, Chandler, AZ (US); Eduardo Velarde, Chandler, AZ (US)

(72) Inventors: Han Zou, Gilbert, AZ (US); Thomas Duffy, Chandler, AZ (US); Eduardo Velarde, Chandler, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 342 days.

(21) Appl. No.: 14/027,060

(22) Filed: Sep. 13, 2013

(65) Prior Publication Data

US 2015/0076902 A1  Mar. 19, 2015

(51) Int. Cl.
*G06F 1/00* (2006.01)
*H02J 7/00* (2006.01)
*H02J 7/02* (2006.01)
*H02M 3/158* (2006.01)

(52) U.S. Cl.
CPC ............... *H02J 7/022* (2013.01); *H02J 7/0068* (2013.01); *H02M 3/158* (2013.01); *Y10T 29/49105* (2015.01); *Y10T 307/344* (2015.04)

(58) Field of Classification Search
CPC ........ H02J 7/0068; H02J 7/007; H02J 7/0024
USPC .............. 307/23; 713/323; 320/23, 107, 145
See application file for complete search history.

(56) References Cited

U.S. PATENT DOCUMENTS

| | | | |
|---|---|---|---|
| 2011/0074373 A1* | 3/2011 | Lin | H02M 3/1582 323/282 |
| 2011/0121653 A1* | 5/2011 | Hartular | H02J 1/10 307/66 |
| 2011/0234151 A1 | 9/2011 | Uan-Zo-Li et al. | |
| 2012/0086276 A1* | 4/2012 | Sawyers | H02J 1/12 307/66 |
| 2012/0139345 A1 | 6/2012 | Ye et al. | |
| 2012/0139500 A1* | 6/2012 | Ye | H02J 7/0068 320/135 |
| 2013/0147277 A1* | 6/2013 | Popescu-Stanesti | H02J 7/0068 307/66 |

* cited by examiner

*Primary Examiner* — Chun Cao
*Assistant Examiner* — Aaron J Browne
(74) *Attorney, Agent, or Firm* — Robert F. Hightower

(57) ABSTRACT

In one embodiment, a power supply controller may be formed including configuring the power supply controller to use an error signal and a ramp signal to control a duty cycle of a switching control signal that is configured to control first and second switches to charge a battery, and configuring the power supply controller to selectively offset a dc value of the ramp signal responsively to detecting the adapter current is greater than a first value wherein offsetting the dc value of the ramp signal changes the duty cycle of the switching control signal to supply current from the battery to a load.

18 Claims, 5 Drawing Sheets

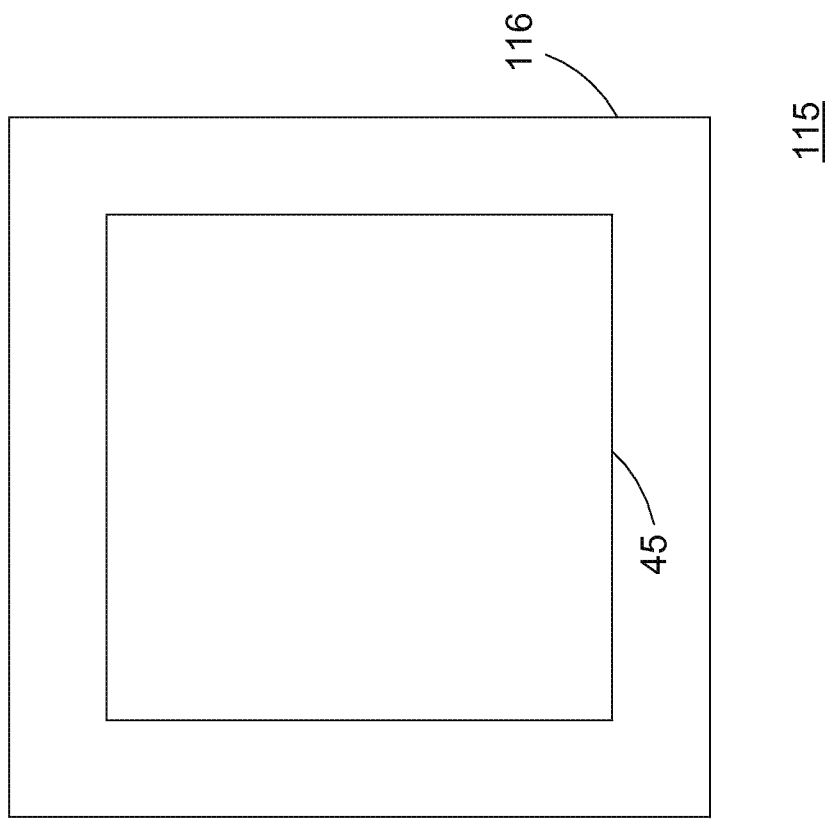

METHOD OF FORMING A POWER SUPPLY CONTROLLER AND STRUCTURE THEREFOR

BACKGROUND OF THE INVENTION

The present invention relates, in general, to electronics, and more particularly, to semiconductors, structures thereof, and methods of forming semiconductor devices.

In the past, the semiconductor industry utilized various methods and structures to form power supply controllers that were usable for recharging batteries. In some applications, the power supply controllers were utilized to control charging of a battery and to control supplying power from a plug-in adapter to both charge a battery and supply power to a load. The load in some applications was a portable electronic device such as a portable computer, a mobile phone, or a portable music player, etc. One particular class of such power supply controllers was sometimes referred to as a hybrid battery charger or a hybrid power supply controller. One example of such a power supply controller was disclosed in United States patent publication number 2012/139345 which is hereby incorporated herein by reference. In some applications, the hybrid power supply controller could be utilized to supply power to the load from both the battery and the adapter.

Such power supply controllers typically required a long period of time for the power supply controller to transition between charging the battery and supplying current from the battery to the load. The long transition time sometimes could cause delays in the system that was using the power supply controller. Additionally, such power supply controllers typically could repeatedly toggle between charging the battery and supplying current from the battery which could result in large discharge currents that may damage the battery.

Accordingly, it is desirable to have an apparatus and method that assists in reducing the transition time from charging the battery and supplying current from the battery, and/or that minimizes toggling between charging the battery and supplying current from the battery.

BRIEF DESCRIPTION OF THE DRAWINGS

FIG. 5 illustrates an enlarged plan view of a semiconductor device that includes the power system of FIG. 1 in accordance with the present invention.

Figure 1:
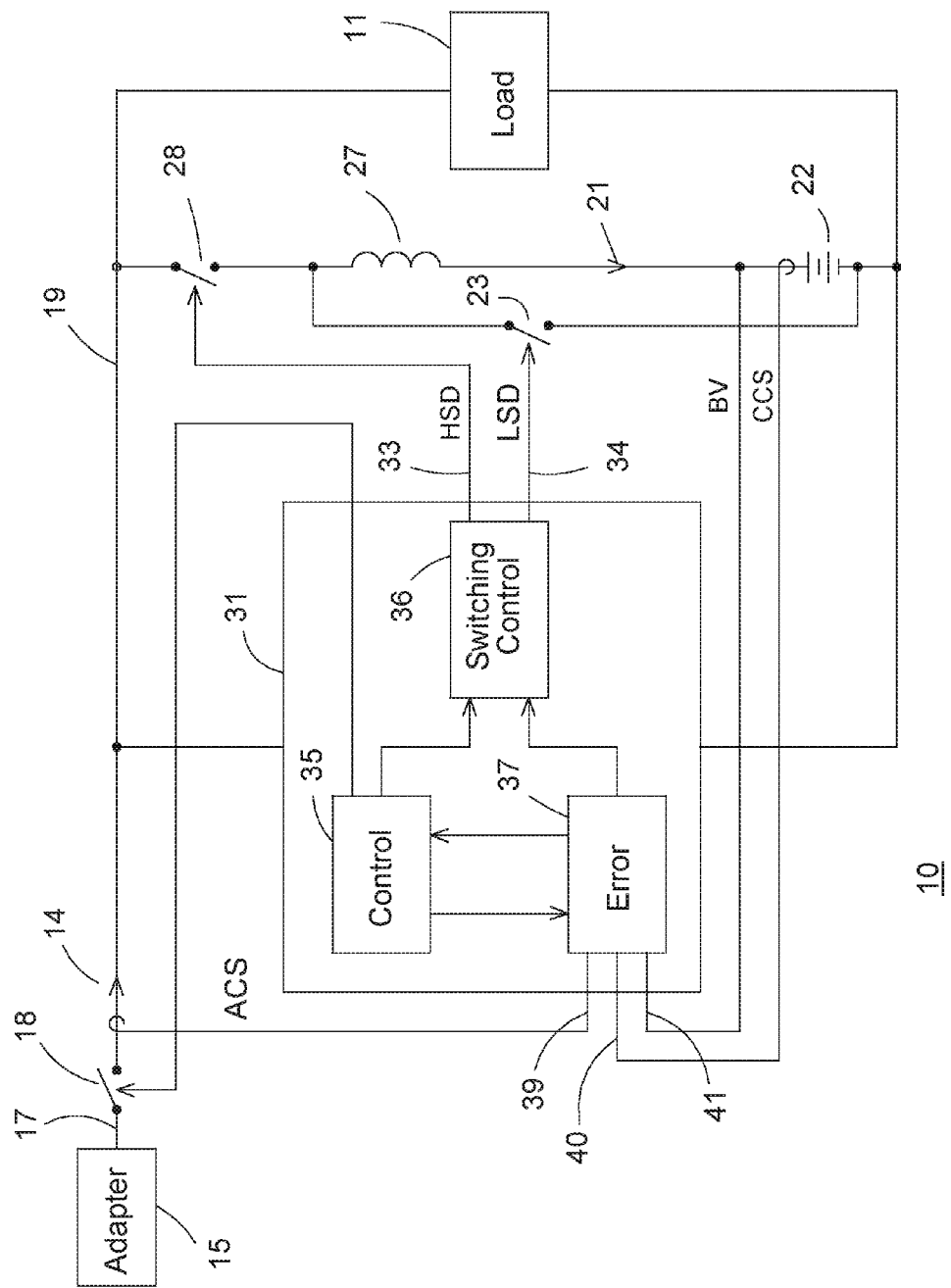
FIG. 1 schematically illustrates a portion of an example of an embodiment of a power supply system that includes a power supply controller in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten per cent (10%) (and up to twenty per cent (20%) for semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION OF THE DRAWINGS

FIG. 1 schematically illustrates a portion of an example of an embodiment of a system 10 that utilizes a power supply controller 31 to charge a battery 22 from a plug-in adapter 15, to supply power from adapter 15 to a load 11, and from battery 22 to load 11. Adapter 15 typically is designed to be plugged into a source of AC power, such as a household mains, and provide a rectified DC voltage and an adapter current 14 from an output 17 of adapter 15 wherein current 14 is supplied at least to load 11. Such adapters are well-known to those skilled in the art. System 10 may also typically include an optional adapter switch 18 which may be enabled or disabled by controller 31. In one non-limiting example, switch 18 may be opened under some conditions to prevent discharging battery 22 into adapter 15. A power switch 28 and a power switch 23 typically are coupled to an inductor 27 and operated by controller 31 in either a buck operational mode in order to supply a charging current 21 to battery 22 or in a boost operational mode to supply current 21 from battery 22 to load 11. Additionally, controller 31 may be configured to supply current 21 from battery 22 to load 11 along with adapter 15 supplying current 14 to load 11. This type of operation is often referred to as a turbo operation mode. In one embodiment, switches 28 and 23 may be power transistors such as power metal oxide semiconductor field effect transistors (MOSFETs).

Controller 31 typically has an input 39 configured to receive an adapter current sense (ACS) signal that is representative of adapter current 14. Controller 31 may also include an input 41 that is configured to receive a battery voltage (BV) signal that is representative of the voltage of battery 22, and an input 40 that is configured to receive a charging current sense (CCS) signal that is representative of the value of charging current 21 or representative of the value of current 21 supplied by battery 22 to load 11. An output 33 of controller 31 typically is utilized to control switch 28 and an output 34 typically is utilized to control switch 23.

Controller 31 is configured to form a switching control signal that is internally used to form a high side switching drive (HSD) signal on output 33 and a low side switching drive (LSD) signal on output 34. In most embodiments, the switching control signal and the HSD and LSD signals typically are formed as pulse width modulated (PWM) switching signals but may be other types of switching signals in other embodiments such as a frequency modulated or other type of well-known modulated switching signal. Controller 31 generally includes a mode control or control circuit 35, a switching control circuit 36, and an error circuit 37.

As will be seen further hereinafter, in one embodiment error circuit 37 is configured to form an error signal that is at least representative of the deviation of adapter current 14 from a desired value of current 14. The desired value of current 14 may be some percentage of the maximum allowable value of current that adapter 15 can supply. For example, the desired value may be ten to twenty per cent (10%-20%) less that the maximum allowable current that adapter 15 can supply, but may be different in some embodiments.

One embodiment of controller 31 may include configuring controller 31 to form an error signal that is representative of a deviation of adapter current 14 from a desired value of current 14, configuring controller 31 to use the error signal and a ramp signal to control a duty cycle of a switching control signal that is configured to control switches 23 and 28 to charge battery 22; and configuring controller 31 to selectively offset a dc value of the ramp signal responsively to detecting that current 14 is greater than a first value wherein offsetting the dc value of the ramp signal changes the duty cycle of the switching control signal to supply current from battery 22 to load 11.

In one embodiment, the first value is greater than the desired value.

Another embodiment may include configuring controller 31 to selectively change a clamp threshold of the error signal from a first clamp value to a second clamp value no earlier than as the dc value of the ramp signal is offset.

Another embodiment may include configuring the controller 31 to selectively remove the offset to the dc value of the ramp signal responsively to detecting that adapter current 14 is less than a second value that is less than the first value wherein removing the offset changes the duty cycle of the switching control signal to inhibit supplying supply current from battery 22 to load 11.

Figure 2:
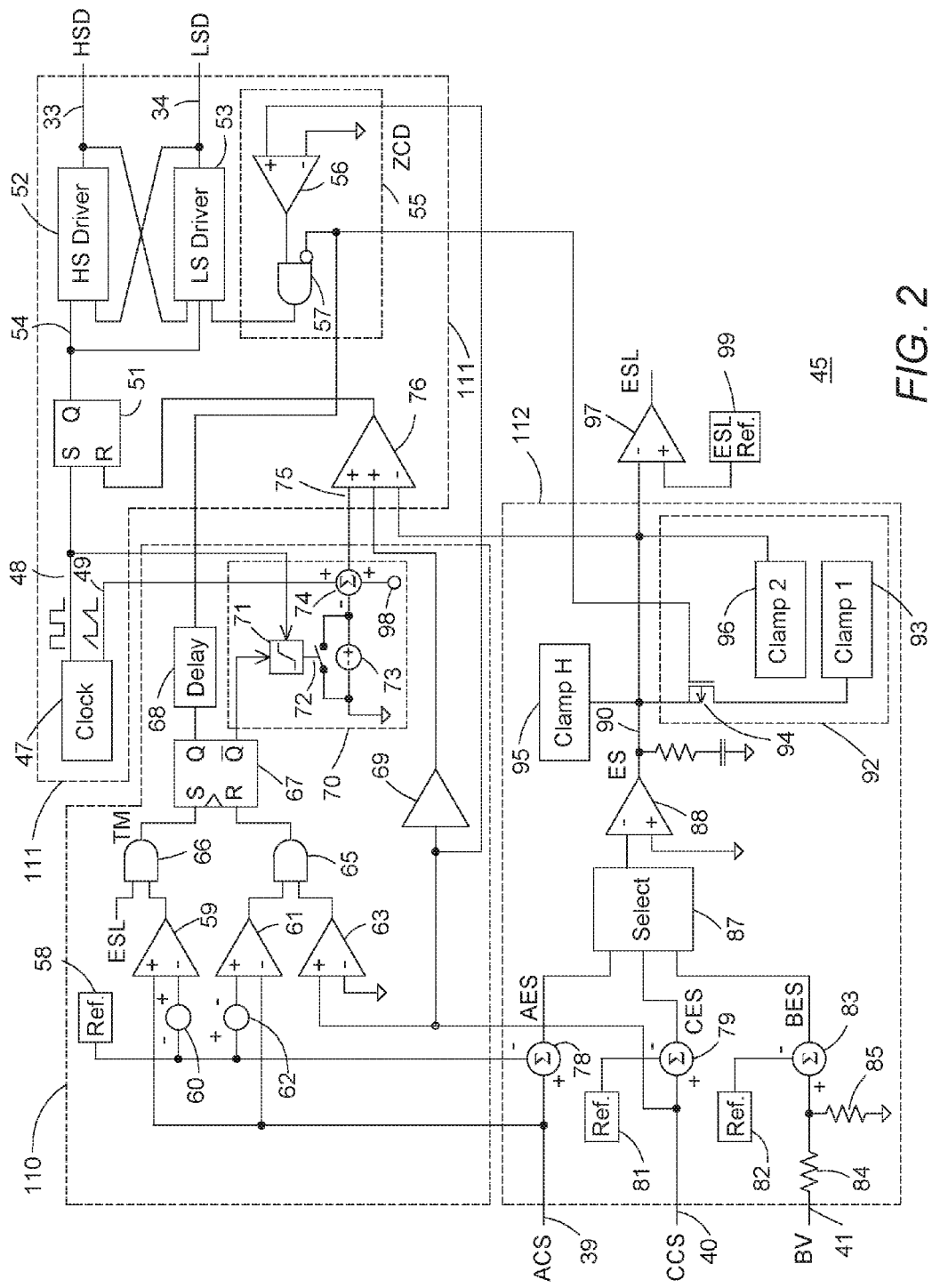
FIG. 2 schematically illustrates a portion of an example of an embodiment of a power supply controller that is an alternate embodiment of the power supply controller of FIG. 1 in accordance with the present invention.

FIG. 2 schematically illustrates a portion of an example of an embodiment of a power supply controller 45 that is an alternate embodiment of and that operates similarly to controller 31 described in the description of FIG. 1. Controller 45 includes a mode control or control circuit 110, a switching control circuit 111, and an error circuit 112 that are alternate embodiments of and that operate similarly to respective circuits 35, 36, and 37 of FIG. 1.

In one embodiment, error circuit 112 may be configured to form an error signal (ES) 90 that is representative of a deviation of one of adapter current 14, charge current 21, or the battery voltage from a desired value of the respective signal. Error circuit 112 is configured to receive the ACS signal and form an adapter error signal (AES) that is representative of the deviation of current 14 from the desired value. For example, an error amplifier 78 may be configured to receive the ACS signal and a reference signal from a reference generator or reference or Ref 58, and form the AES signal. For such a non-limiting example, the value of Ref 58 may be representative of the desired value of current 14. Similarly, an error amplifier 79 may be utilized to receive the CCS signal and form a charging current error signal (CES) that is representative of the deviation of current 21 from a desired value of current 21. Further, an error amplifier 83 may receive a signal that is representative of the voltage of battery 22 and form a battery error signal (BES) that is representative of a deviation of the voltage of battery 22 from a desired value of the battery voltage. Those skilled in the art will appreciate that resistors 84 and 85 represent an optional feedback network that may be utilized to form a feedback signal at a voltage value that is suitable for use by controller 45. Additionally, the feedback signal may be formed by other well-known feedback networks. The feedback signal is representative of the value of the battery voltage. Additionally, amplifiers 79 and 83 may receive a reference voltage such as from respective reference circuits or Refs 81 and 82. Those skilled in the art will appreciate that amplifiers 78, 79, and 83 typically may also include filter and loop control networks that are used to control the control loop response of system 10. Such elements may be external to controller 45.

A selector circuit or select circuit or select 87 may be configured to receive the AES, CES, and BES error signals and select the one having the highest value to the output of circuit 87. An optional amplifier 88 may be used to amplify the signal from selector 87 and form error signal (ES) 90. In one embodiment, circuit 112 may also include a clamp circuit 92 that is used to selectively limit the low value of circuit 92 to one of a first value or a second value. In one embodiment, the second value may be less than the first value. Clamp circuit 92 includes a clamp1 circuit 93 that has a first clamp value, a clamp2 circuit 96 that has a second clamp value which is less than the first clamp value, and a clamp switch 94. Circuit 112 may also include an optional high clamp circuit or clampH 95 that is utilized to limit the maximum value of error signal 90 to a high clamp value. Those skilled in the art will appreciate that the illustrated embodiment of error circuit 112 is just an example representation and that error signal 90 may be formed by other methods and circuit configurations as long as it is configured to form an error signal that is representative of the deviation of adapter current 14 from the desired value of current 14. For example, the error circuit may be formed such that individual error signals are formed for each of the individual ACS, CCS, and BV signals and each may be switched or selected by selectively enable selector switches or other various means to form error signal 90, or alternately, each of the AES, CCS, and BES signal may go to a multi-input comparator.

Circuit 111 typically includes a clock circuit 47 that is configured to form a clock signal or clock 48 and a base ramp signal 49. Typically, clock signal 48 and base ramp signal 49 operate at the same frequency such that base ramp signal 49 is reset to zero near the beginning of one edge of clock 48, for example a falling edge, and begins increasing near an opposite edge of clock 48. The frequency of clock 48 and signal 49 typically is fixed but may be variable in other embodiments. Those skilled in the art will appreciate that clock circuit 47 has various implementations and may be configured as one circuit or separated into multiple separate circuits. A latch 51 of circuit 111 is set by one edge of clock 48 thereby asserting a switching control signal 54 of circuit 111. In some embodiments, latch 51 may be referred to as a PWM latch. In one embodiment, a driver portion of circuit 111 may include a high side driver circuit or driver 52 and a low side driver circuit or driver 53 that receive switching control signal 54 and form the HSD and LSD signal as non-overlapping drive signals.

Mode control circuit or control circuit 110 is configured to detect that current 14 is greater than an a threshold value or first value of current 14 and to responsively cause the duty cycle of signal 54 to change such that controller 45 operates switches 23 and 28 to supply current from battery 22 to load 11, such as for example along with adapter 15 supplying current 14 to load 11. The threshold value or first value of current 14 usually is greater than the desired value of current 14 and may be selected to be a maximum value or some percentage of the maximum value that adapter 15 should supply, but may be other values in other embodiments. In one embodiment, circuit 110 includes a comparator 59 that is configured to detect that the value of current 14 is greater than the threshold value. Comparator 59 may be configured to receive the ACS signal and a reference signal that is representative of the threshold value. In one embodiment, circuit 110 also includes a reference generator or Ref 58 that provides a reference signal, offset circuits or offsets 60 and 62 that provide offset signals to the signal from Ref 58, AND gates 65 and 66, a mode latch 67, a delay circuit or delay 68, and a ramp adjust circuit 70. In one embodiment, ramp adjust circuit 70 may include an optional detect circuit 71, a ramp adjust switch 72, a ramp offset signal 73, and a ramp summing circuit 74. Circuit 70 is configured to form a ramp signal or ramp 75. In one embodiment, the duty cycle of switching control signal 54 is controlled responsively to error signal 90 and ramp 75. In one embodiment, controller 45 or circuit 110 may be configured to offset a dc value of ramp 75 responsively to controller 45 detecting that adapter current 14 is greater than the first value. Those skilled in the art will appreciate that the illustrated embodiment of circuit 70 is just an example representation and circuit 70 may be formed by other methods and circuit configurations as long as it is configured to offset a dc value of ramp signal 75 responsively to controller 45 detecting that adapter current 14 is greater than the first value. In an embodiment, circuit 110 may also be configured to detect that the value of current 14 is less than the threshold value. For example, in one embodiment circuit 110 may include a comparator 61 that is configured to detect that the value of current 14 is less than the threshold value.

Figure 3:
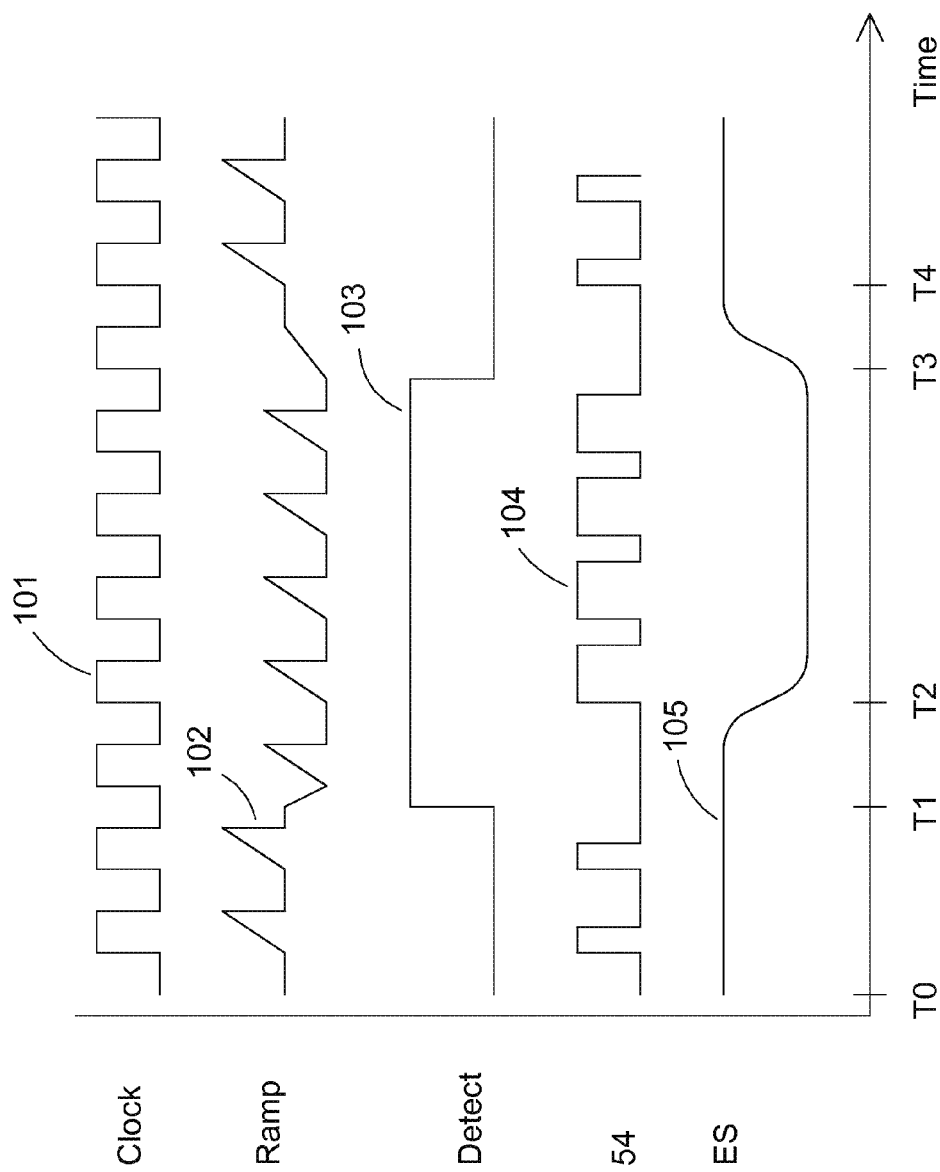
FIG. 3 is a graph having plots that illustrate some of the signals formed by the power supply controller of FIG. 2 in accordance with the present invention.

FIG. 3 is a graph having plots that illustrate some of the signals formed by controller 45. The abscissa indicates time and the ordinate indicates increasing value of the illustrated signal. A plot 101 illustrates clock 48, a plot 102 illustrates ramp 75, a plot 103 illustrates a detect signal on the output of latch 67, a plot 104 illustrates switching control signal 54, and plot 105 illustrates error signal (ES) 90.

Figure 4:
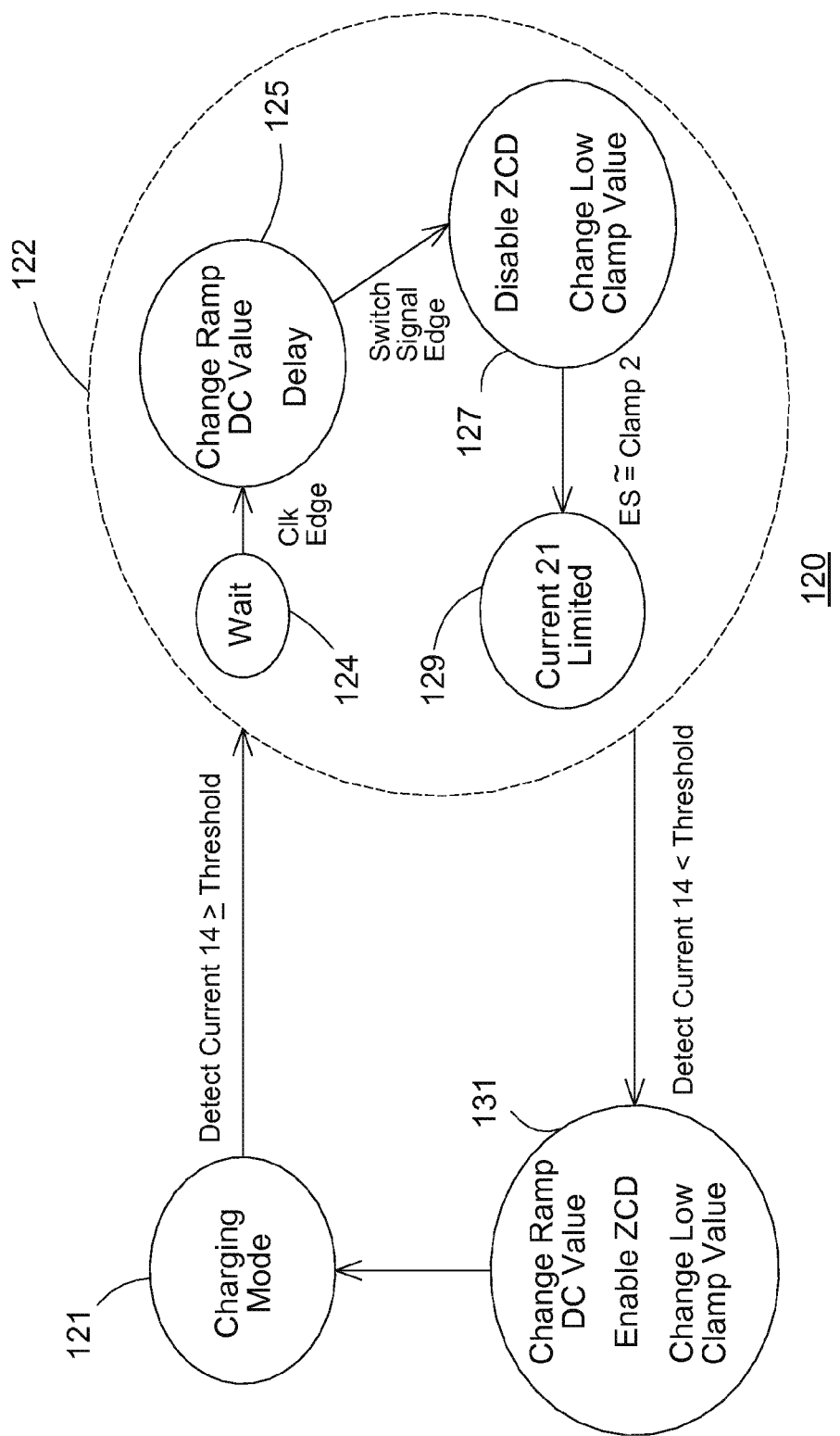
FIG. 4 is a state diagram illustrating an example of embodiments of some operating states of the power supply controller of FIG. 2 in accordance with the present invention.

FIG. 4 is a state diagram illustrating an example of embodiments of some operating states of controller 45. This description has references to FIG. 1-FIG. 4.

In operation, assume that at a time T0, current 14 is less than the threshold value and that controller 45 is operating in the charging mode as illustrated by a state 121 (FIG. 4) where controller 45 operates switches 23 and 28 in a buck mode to charge battery 22 from adapter 15. During this type of operation, either the CCS signal or the BV signal generally may be greater than the ACS signal, and error signal 90 may be formed to be representative of either the CCS or BV signals. Circuit 111 receives error signal 90 and ramp 75, and uses signal 90 and ramp 75 to control the duty cycle of signal 54. In one embodiment, circuit 111 receives error signal 90 and ramp 75 and uses signal 90 and ramp 75 to reset latch 51 responsively to the error signal being approximately equal to the ramp signal to control the duty cycle.

During operation, load 11 may require a higher value of current thereby increasing the value of current 14. Assume that at a time T1, the value of current 14 increases to near the threshold value. The value of the ACS signal on input 39 increases and becomes greater than either the CCS or BV signals and error circuit 112 forms signal 90 to be representative of the deviation of current 14 from the desired value of current 14. As current 14 increases to the threshold value, circuit 110 detects that current 14 is no less than the threshold value as illustrated between states 121 and 122 (FIG. 4), and the output of comparator 59 is responsively asserted. Typically, the value of error signal 90 is less than the value of Ref 99 thus, the optional ESL signal is also asserted. Therefore, the asserted state of comparator 59 sets latch 67 to store the detection of current 14 being no less than the threshold value.

Ramp adjust circuit 70 is configured to change the DC value of ramp 75 after controller 45 detects that current 14 is no less than the threshold value as illustrated by state 124. One embodiment includes configuring circuit 110 to change a DC offset of ramp 75 and then form a delay as illustrated by state 125 in FIG. 4. In a non-limiting example embodiment of circuit 70, the negated Q bar output of latch 67 is detected by the next edge of clock 48, such as for example by optional detect circuit 71, which disables switch 72. In a non-limiting example, the negated state of the Q bar signal may be clocked into an optional flip-flop by clock 48. In another embodiment, the Q bar output of latch 67 may directly enable switch 72. Disabling switch 72 causes circuit 74 to change a DC offset of ramp 75. In one non-limiting example embodiment, circuit 70 subtracts a DC offset of offset 73 from signal 49, as illustrated by plot 102 at time T1, thereby decreasing the DC value of ramp 75. Changing the DC value of ramp 75 typically causes the output of comparator 76 to become asserted and reset latch 51 as illustrated by plot 104 at time T1. Those skilled in the art will appreciate that other circuit embodiments may be used to offset ramp 75 in addition to the implementation illustrated in FIG. 2. The amount that ramp 75 is offset is usually selected based on the value of the voltage from adapter 15 and the voltage of battery 22. As the adapter voltage increases, the offset value typically decreases, and as the value of the battery voltage increases, the value of the offset usually increases. Typically, the voltage of offset 73 is a fixed value selected as described, however, in some embodiments, the value of offset 73 may be a variable value that is a function of the adapter and battery voltages as described hereinbefore.

Changing the DC value of ramp 75 may cause the value of ramp 75 to shift or transition. Therefore, controller 45 is configured to delay a time interval after changing the DC value to allow settling of ramp 75. One embodiment of circuit 110 may include a delay circuit 68 that is configured to form a delay between detecting the threshold value of current 14 and performing other operations. Delay circuit 68 receives the asserted Q output of latch 67 and delays it for the time interval prior to asserting the output of delay 68. In other embodiments, the delay may be initiated by other circuits, for example by the output of comparator 59 or gate 66. In one non-limiting example embodiment, delay circuit 68 may be configured to form the time interval of the delay to be approximately equal to one cycle of clock 48. For the embodiment that includes optional detect circuit 71, the time interval formed by delay 68 is greater than any delay that may be formed by circuit 71. As illustrated at time T2, the next rising edge of clock 48 may set latch 51 thereby initiating another cycle of signal 54. Because of the changed DC value of ramp 75, the duty cycle of signal 54 has changed and controller 45 operates switches 23 and 28 to supply current from battery 22 to load 11 in addition to current 14 that is supplied by adapter 15.

Changing the DC value of ramp 75 may also affect error signal 90. Therefore controller 45 is configured to change a lower clamp value of error signal 90 from a first clamp value to a second clamp value after detecting that current 14 is no less than the threshold or value as illustrated by state 127 (FIG. 4). Controller 45 may be configured to change the first clamp value to the second clamp value a first time interval after detecting that current 14 is no less than the threshold value. The second clamp value may be less than the first clamp value in one embodiment. One embodiment of circuit 112 may include that the asserted state of the output of delay 68 disables transistor 94 which decouples signal 90 from the output of circuit 93. This changes the low clamp value of signal 90 to the value formed by circuit 96. The value formed by circuit 96 typically is less than the value formed by circuit 93, thus, the lower clamp value of signal 90 is decreased. In one embodiment, the second clamp value allows the value of ES 90 to decrease to a lower value. This allows controller 45 to limit the value of current 21 supplied by battery 22 to a lower value.

Circuit 111 may also include a zero detect circuit (ZCD) 55 that is configured to detect that the discharge current from inductor 27 (FIG. 1) has reached a value that is either close to zero or substantially zero. Those skilled in the art will appreciate that driver 53 may be configured to negate LSD signal on output 34 to disable switch 23 (FIG. 1) in response to detecting the zero current condition. Controller 45 may be configured to enable circuit 55 during the charging operation of controller 45. Controller 45 may also be configured to disable ZCD circuit 55 after controller 45 detects that current 14 is greater than the threshold value. Controller 45 may be configured to form a delay between detecting the threshold value of current 14 and disabling circuit 55. In one non-limiting example embodiment, the asserted output of delay 68 may be used to disable gate 57 and block gate 57 from transmitting the ZCD signal from comparator 56 to low side driver circuit 53. In some embodiments, circuit 55 may be omitted.

Those skilled in the art will appreciate that circuit 110 detects the threshold value of current 14 and changes the duty cycle of signal 54 independently of the delay times of the filter network and control loop response times in the feedback and control loops. Thus, the response time of controller 45 is very fast. Typically, the response time is less than approximately two hundred micro-seconds (200 μs). In one example embodiment, the response time was less than approximately one hundred micro-seconds (100 μs). Also, because detection of current 14 reaching the threshold value is stored by latch 67, controller 45 does not toggle back and forth between the charging and turbo modes.

In one embodiment, controller 45 is configured to detect current 14 having a value that is less than the threshold value and to restore the DC value of ramp 75 as illustrated by state 131. Controller 45 may also be configured to re-enable circuit 55. Additionally, circuit 110 may be configured use hysteresis and detecting that current 14 is decreased to less than the threshold value. In one non-limiting example embodiment, comparator 61 may be configured to detect that current 14 is less than the threshold value by differential amount to further assist in preventing toggling between the charging and turbo modes. In one non-limiting example embodiment, comparator 61 may be configured to receive the ACS signal and compare it to a reference signal that is less than the reference signal used by comparator 59. For example, the reference signal for comparator 61 is the value of Ref 58 minus the value of offset 62 so that the differential value is approximately equal to the value of offset 60 plus offset 62.

Controller 45 may be configured to detect that current 14 is less than the threshold value and to restore the DC value of ramp 75 as illustrated near a time T3. After the expiration of the delay from delay 68, circuit 70 removes offset 73 from the DC value of ramp 75. For example, circuit 70 may enable switch 72 to short out the value of offset 73. Controller 45 may also be configured to delay the time interval and change the low clamp value of signal 90 to the first clamp value and to also re-enable operation of circuit 55 as illustrated near time T4. After the delay of delay 68, the asserted output of delay 68 may enable operation of ZCD 55 such as by enabling gate 57 to pass the signal from comparator 56.

Circuit 110 may optionally include an ESL comparator 97 that is used to detect that error signal 90 is lower than a low threshold of error signal 90. An ESL reference circuit or ESL ref 99 forms a reference signal that is representative of the low threshold of error signal 90. An AND gate 66 of circuit 110 receives the output of comparator 59 and 97. Typically, error signal 90 has reached the ESL threshold prior to circuit 110 detecting the current 14 has reached the threshold value of current 14. Therefore, as comparator 59 is asserted, the output of gate 66 usually is also asserted indicating that current 14 has reached the threshold value and that battery 22 should be utilized to supply additional current to load 11.

In order to facilitate this functionality for controller 45, input 39 is commonly connected to a non-inverting input of amplifier 78, an inverting input of comparator 61, and a non-inverting input of comparator 59. An output of Ref 58 is commonly connected to a negative terminal of offset 60, a positive terminal of offset 62, and an inverting input of amplifier 78. An output of amplifier 78 is connected to a first input of select 87. Input 40 is commonly connected to a non-inverting input of amplifier 79, an input of amplifier 69, and to a non-inverting input of comparator 56. An output of Ref 81 is connected to an inverting input of amplifier 79 which has an output commonly connected to a second input of select 87 and to a non-inverting input of comparator 63. Input 41 is connected to a non-inverting input of amplifier 83 which has an inverting input connected to an output of Ref 82. An output of amplifier 83 is connected to a third input of select 87. The output of select 87 is connected to an inverting input of amplifier 88 which has a non-inverting input connected to a common reference. An output of amplifier 88 is commonly connected to an output of circuit 95, a source of transistor 94, an output of circuit 96, an inverting input of comparator 97, and an inverting input of comparator 76. A drain of transistor 94 is connected to an output of circuit 93, and a gate of transistor 94 is connected to the output of delay 68. A non-inverting input of comparator 97 is connected to the output of Ref 99. The output of comparator 97 is connected to a first input of gate 66. A second input of gate 66 is connected to the output of comparator 59. The output of gate 66 is connected to a set input of latch 67. The reset input of latch 67 is connected to an output of gate 65. A first input of gate 65 is connected to the output of comparator 61 and a second input of gate 65 is connected to the output of comparator 63. An inverting input of comparator 63 is connected to the common reference. A Q output of latch 67 is connected to the input of delay 68. A Q bar output of latch 67 is connected to a first input of circuit 71 which has a second input connected to clock 48. The output of circuit 71 is connected to a control input of switch 72. Switch 72 is connected in parallel with offset 73. A first terminal of switch 72 is connected to an inverting terminal of offset 73 and a second terminal of switch 72 is connected to a positive terminal of offset 73 and to an inverting input of summing circuit 74. A first non-inverting input of circuit 74 is connected to the output of Ref 99 and a second non-inverting input of circuit 74 is connected to signal 49. The output of circuit 74 is connected to a non-inverting input of comparator 76. A second non-inverting input of comparator 76 is connected to the output of amplifier 69. The output of comparator 76 is connected to a reset input of latch 51. A set input of latch 51 is connected to clock 48. A Q output of latch 51 is commonly connected to a first input of driver 52 and a first input of driver 53. A second input of driver 53 is connected to the output of gate 57. A second input of gate 57 is connected to the output of comparator 56.

FIG. 5 illustrates an enlarged plan view of a portion of an embodiment of a semiconductor device or integrated circuit 115 that is formed on a semiconductor die 116. Controllers 31 or 45 are formed on die 116. Die 116 may also include other circuits that are not shown in FIG. 5 for simplicity of the drawing. Controller 31 and/or 45 and device or integrated circuit 115 are formed on die 116 by semiconductor manufacturing techniques that are well known to those skilled in the art.

From all the foregoing one skilled in the art can determinate that according to one embodiment, a power supply controller may comprise; a first input, for example input 39, configured to receive a first current sense signal, for example ACS, that is representative of an adapter current supplied from an ac adapter, for example adapter 15, to at least a load, for example load 11;

a second input, input 41 for example, configured to receive a feedback signal, for example BV, that is representative of a voltage of a battery, battery 22 for example;

an error circuit, for example circuit 112, configured to form an error signal that is representative of a deviation of the adapter current from a desired value of the adapter current;

a switching control circuit, circuit 46 for example, configured to form a switching control signal, for example signal 54, to control first and second switches, switches 28/23 for example, the switching control circuit configured to form a ramp signal and to control a duty cycle of the switching control signal responsively to a difference between the ramp signal and the error signal wherein the switching control circuit controls the first and second switches to charge the battery from the ac adapter responsively to the adapter current being less than a first value, such as the non-limiting example of the value of Ref 58+offset 60;

a control circuit, such as elements 71/72/73 for example, configured to detect that the adapter current is greater than the first value, the control circuit configured to offset a dc value of the ramp signal responsively to detecting that the adapter current is greater than the first value wherein the switching control circuit controls the first and second switches to supply current from the battery to the load responsively to the adapter current being greater than the first value, such as Ref 58+offset 60 for a non-limiting example; and a clamp circuit configured to clamp a low value of the error signal to a lower clamp value, the clamp circuit configured to change the lower clamp value of the error signal from a first clamp value to a second clamp value, that is less than the first clamp value, a first time interval, for example the interval formed by delay 68, after detecting that the adapter current is greater than the first value.

Another embodiment may include a zero detect circuit configured to detect a discharge current of an inductor becoming approximately zero wherein the inductor is coupled to the first and second switches, the power supply controller configured to disable the zero detect circuit subsequent to detecting that the adapter current is greater than the first value.

One embodiment may include that the power supply controller is configured to disable the zero detect circuit approximately the first time interval after detecting that the adapter current is greater than the first value.

In another embodiment, the power supply controller may include a delay circuit configured to form the first time interval responsively to the power supply controller detecting that the adapter current is greater than the first value.

One embodiment may include a clock circuit configured to form a clock signal having a frequency that is no less than a frequency of the switching control signal wherein the first time interval is approximately a cycle of the clock signal.

Another embodiment may include that the error circuit includes a signal select circuit, such as circuit 87 for example, that is configured to select the error signal as one of an adapter error signal, such as AES for example, that is representative of the deviation of the adapter current from the desired value of the adapter current, or a battery error signal, Such as VES for example, that is representative of a deviation of a voltage of the battery from a desired value of the voltage of the battery or a charging current error signal, for example CES, that is representative of the deviation of a charging current of the battery from a desired value of the charging current.

An embodiment may include that the clamp circuit includes a clamp switch coupled to a node of the error signal and coupled to a first clamp circuit having the first clamp value wherein the clamp switch is disabled responsively to expiration of the first time interval to decouple the error signal from the first clamp value.

One embodiment may include that the clamp circuit includes a second clamp circuit coupled to the node of the error signal, the second clamp circuit having the second clamp value.

Those skilled in the art will appreciate that one embodiment of a method of forming a power supply controller may comprise; configuring the power supply controller to receive a first current sense signal, for example signal ACS, that is representative of an adapter current supplied from an ac adapter;

configuring an error circuit, such as circuit 112 for example, to selectively form an error signal that is representative of a deviation of the adapter current from a desired value of the adapter current;

configuring a switching control circuit, for example circuit 46, to use the error signal and a ramp signal to control a duty cycle of a switching control signal, such as signal 54 for example, to control first and second switches, such as switches 28/23 for example; and configuring a control circuit, such as circuits 71/72/73, to selectively offset a dc value of the ramp signal from a first dc value to a second dc value responsively to the adapter current being greater than a first value wherein the second dc value changes the duty cycle of the switching control signal and wherein a battery supplies current to a load in addition to the ac adapter.

Another embodiment of the method may include configuring the switching control signal to control first and second switches to form a current to charge the battery responsively to the adapter current being less than the first value wherein the first and second switches are coupled to an inductor.

An embodiment may include configuring the control circuit to decrease the dc value of the ramp signal from the first dc value to the second dc value.

One embodiment may include configuring the error circuit to selectively change a clamp threshold of the error signal from a first clamp value to a second clamp value, that may be less than the first clamp value, after the dc value of the ramp signal is offset.

In one embodiment, the method may include configuring the error circuit to selectively change a lower clamp threshold of the error signal from a first clamp value to a second clamp value no earlier than as the dc value of the ramp signal is offset.

Another embodiment may include configuring the control circuit to detect that adapter current is no less than the first value.

Those skilled in the art will understand that one embodiment of a method of forming a power supply controller may comprise; configuring the power supply controller to receive a first current sense signal, such as signal ACS for example, that is representative of an adapter current supplied from an ac adapter to at least a load, such as load 11 for example;

configuring the power supply controller to form an error signal that is representative of a deviation of the adapter current from a desired value of the adapter current;

configuring the power supply controller to use the error signal and a ramp signal, such as respective signals 74/76 for example, to control a duty cycle of a switching control signal that is configured to control first and second switches to charge a battery; and configuring the power supply controller to selectively offset a dc value of the ramp signal responsively to detecting the adapter current is greater than a first value wherein offsetting the dc value of the ramp signal changes the duty cycle of the switching control signal to supply current from the battery to the load.

Another embodiment of the method may include configuring the power supply controller to selectively change a clamp threshold of the error signal from a first clamp value to a second clamp value no earlier than as the dc value of the ramp signal is offset.

An embodiment may include configuring the power supply controller to form the first clamp value greater than the second clamp value.

One embodiment may include configuring the power supply controller to decrease the dc value of the ramp signal.

Another embodiment may include selectively disabling a zero current detection circuit no earlier than as the dc value of the ramp signal is offset wherein the zero current detection circuit is configured to detect approximately zero discharge current condition of an inductor coupled to the first and second switches.

Another embodiment may include configuring the power supply controller to selectively remove the offset to the dc value of the ramp signal responsively to detecting that the adapter current is less than a second value that is less than the first value wherein removing the offset changes the duty cycle of the switching control signal to inhibit supplying supply current from the battery to the load.

In view of all of the above, it is evident that a novel device and method is disclosed. Included, among other features, is forming a power supply controller to rapidly switch from a charging mode to a turbo mode. Forming the controller to offset the DC value of the ramp rapidly switches the controller between the modes without incurring the delay of the loop control circuit. Detecting the value of the adapter current prior to the delay incurred by the error amplifier filter control elements also assists in making a rapid transition between the modes.

While the subject matter of the descriptions are described with specific preferred embodiments and example embodiments, the foregoing drawings and descriptions thereof depict only typical and examples of embodiments of the subject matter and are not therefore to be considered to be limiting of its scope, it is evident that many alternatives and variations will be apparent to those skilled in the art. Those skilled in the art will appreciate that although the description is described using N-channel transistors, other transistor types may be used including P-channel or bipolar transistors.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A power supply controller comprising:
   a first input configured to receive a first current sense signal that is representative of an adapter current supplied from an ac adapter to at least a load;
   a second input configured to receive a feedback signal that is representative of a voltage of a battery;
   an error circuit configured to form an error signal that is representative of a deviation of the adapter current from a desired value of the adapter current;
   a switching control circuit configured to form a switching control signal to control first and second switches, the switching control circuit configured to form a ramp signal and to control a duty cycle of the switching control signal responsively to a difference between the ramp signal and the error signal wherein the switching control circuit controls the first and second switches to charge the battery from the ac adapter responsively to the adapter current being less than a first value;
   a control circuit configured to detect that the adapter current is greater than the first value, the control circuit configured to offset a dc value of the ramp signal responsively to detecting that the adapter current is greater than the first value wherein the switching control circuit controls the first and second switches to supply current from the battery to the load responsively to the adapter current being greater than the first value; and
   a clamp circuit configured to clamp a low value of the error signal to a lower clamp value, the clamp circuit configured to change the lower clamp value of the error signal from a first clamp value to a second clamp value, that is less than the first clamp value, a first time interval after detecting that the adapter current is greater than the first value.

2. The power supply controller of claim 1 further including a zero detect circuit configured to detect a discharge current of an inductor becoming approximately zero wherein the inductor is coupled to the first and second switches, the power supply controller configured to disable the zero detect circuit subsequent to detecting that the adapter current is greater than the first value.

3. The power supply controller of claim 2 wherein the power supply controller is configured to disable the zero detect circuit approximately the first time interval after detecting that the adapter current is greater than the first value.

4. The power supply controller of claim 1 further including a delay circuit configured to form the first time interval responsively to the power supply controller detecting that the adapter current is greater than the first value.

5. The power supply controller of claim 1 further including a clock circuit configured to form a clock signal having a frequency that is no less than a frequency of the switching control signal wherein the first time interval is approximately a cycle of the clock signal.

6. The power supply controller of claim 1 wherein the error circuit includes a signal select circuit that is configured to select the error signal as one of an adapter error signal that is representative of the deviation of the adapter current from the desired value of the adapter current, or a battery error signal that is representative of a deviation of a voltage of the battery from a desired value of the voltage of the battery or a charging current error signal that is representative of the deviation of a charging current of the battery from a desired value of the charging current.

7. The power supply controller of claim 1 wherein the clamp circuit includes a clamp switch coupled to a node of the error signal and coupled to a first clamp circuit having the first clamp value wherein the clamp switch is disabled responsively to expiration of the first time interval to decouple the error signal from the first clamp value.

8. The power supply controller of claim 7 wherein the clamp circuit includes a second clamp circuit coupled to the node of the error signal, the second clamp circuit having the second clamp value.

9. A method of forming a power supply controller comprising:
configuring the power supply controller to receive a first current sense signal that is representative of an adapter current supplied from an ac adapter;
configuring an error circuit to selectively form an error signal that is representative of a deviation of the adapter current from a desired value of the adapter current;
configuring a switching control circuit to use the error signal and a ramp signal to control a duty cycle of a switching control signal to control first and second switches;
configuring a control circuit to selectively offset a dc value of the ramp signal from a first dc value to a second dc value responsively to the adapter current being greater than a first value wherein the second dc value changes the duty cycle of the switching control signal and wherein a battery supplies current to a load in addition to the ac adapter; and
configuring the error circuit to selectively change a lower clamp threshold of the error signal from a first clamp value to a second clamp value approximately no earlier than as the dc value of the ramp signal is offset.

10. The method of claim 9 wherein configuring the switching control circuit use the error signal and the ramp signal to control the duty cycle of the switching control signal further includes configuring the switching control signal to control first and second switches to form a current to charge the battery responsively to the adapter current being less than the first value wherein the first and second switches are coupled to an inductor.

11. The method of claim 9 wherein configuring the control circuit to selectively offset the dc value of the ramp signal includes configuring the control circuit to decrease the dc value of the ramp signal from the first dc value to the second dc value.

12. The method of claim 11 wherein configuring the error circuit to selectively form the error signal includes configuring the error circuit to selectively change a clamp threshold of the error signal from a first clamp value to a second clamp value, that is less than the first clamp value, after the dc value of the ramp signal is offset.

13. The method of claim 9 wherein configuring the control circuit to selectively offset the dc value of the ramp signal includes configuring the control circuit to detect that adapter current is no less than the first value.

14. A method of forming a power supply controller comprising:
configuring the power supply controller to receive a first current sense signal that is representative of an adapter current supplied from an ac adapter to at least a load;
configuring the power supply controller to form an error signal that is representative of a deviation of the adapter current from a desired value of the adapter current;
configuring the power supply controller to use the error signal and a ramp signal to control a duty cycle of a switching control signal that is configured to control first and second switches to charge a battery;
configuring the power supply controller to selectively offset a dc value of the ramp signal responsively to detecting the adapter current is greater than a first value wherein offsetting the dc value of the ramp signal changes the duty cycle of the switching control signal to supply current from the battery to the load; and
selectively disabling a zero current detection circuit approximately no earlier than as the dc value of the ramp signal is offset wherein the zero current detection circuit is configured to detect approximately zero discharge current condition of an inductor coupled to the first and second switches.

15. The method of claim 14 further including configuring the power supply controller to selectively change a clamp threshold of the error signal from a first clamp value to a second clamp value approximately no earlier than as the dc value of the ramp signal is offset.

16. The method of claim 15 including configuring the power supply controller to form the first clamp value greater than the second clamp value.

17. The method of claim 14 wherein configuring the power supply controller to selectively offset the dc value of the ramp signal includes configuring the power supply controller to decrease the dc value of the ramp signal.

18. The method of claim 14 further including configuring the power supply controller to selectively remove the offset to the dc value of the ramp signal responsively to detecting that the adapter current is less than a second value that is less than the first value wherein removing the offset changes the duty cycle of the switching control signal to inhibit supplying supply current from the battery to the load.

* * * * *